(12) United States Patent  
Töyrylä et al.

(10) Patent No.: US 7,970,711 B2  
(45) Date of Patent: Jun. 28, 2011

(54) WARRANTY MANAGEMENT SYSTEM AND METHOD

(75) Inventors: Ilkka Töyrylä, Klaukkala (FI); Eduardo Alves da Cunha, São Paulo (BR)

(73) Assignee: Accenture Global Services GmbH, Schaffhausen (CH)

( * ) Notice: Subject to any disclaimer, the term of this patent is extended or adjusted under 35 U.S.C. 154(b) by 766 days.

(21) Appl. No.: 11/748,287

(22) Filed: May 14, 2007

(65) Prior Publication Data

US 2007/0265886 A1 Nov. 15, 2007

Related U.S. Application Data

(60) Provisional application No. 60/800,278, filed on May 12, 2006.

(51) Int. Cl.
*G06Q 10/00* (2006.01)
(52) U.S. Cl. ........................................................ 705/302
(58) Field of Classification Search ...................... None
See application file for complete search history.

(56) References Cited

U.S. PATENT DOCUMENTS

| | | | |
|---|---|---|---|
| 5,245,554 A * | 9/1993 | Tsuyama et al. | 702/185 |
| 2005/0015273 A1 * | 1/2005 | Iyer | 705/1 |
| 2006/0069581 A1 * | 3/2006 | Chien et al. | 705/1 |

OTHER PUBLICATIONS

Taylor, John Keenan & Cichow, Cheryl. Statistical Techniques for Data Analysis. 2nd Edition. CRC Press. 2004. pp. 23-27, 30-32 and 210-212.*

* cited by examiner

*Primary Examiner* — Jason M Borlinghaus
(74) *Attorney, Agent, or Firm* — Finnegan, Henderson, Farabow, Garrett & Dunner LLP

(57) ABSTRACT

A warranty management data processing system, method, and computer program are provided for determining relationships of data associated with warranty claims. Warranty data for a plurality of products is received and stored, and warranty service providers file repair/replace warranty claims against the warranties for the corresponding products. The repair/replace warranty claims are processed and repair/replace claims data is generated. The stored warranty data and the repair/replace claims data are analyzed, and a graphical representation of a distribution of the repair/replace claims data for one of the warranty service providers is generated.

15 Claims, 14 Drawing Sheets

WARRANTY MANAGEMENT SYSTEM AND METHOD

CROSS REFERENCE TO RELATED APPLICATIONS

This application claims the benefit of U.S. Provisional Application No. 60/800,278, filed May 12, 2006, the contents of which are incorporated herein in its entirety.

BACKGROUND OF THE INVENTION

In many industries, including but not limited to the electronics and high-tech, warranty-related costs have increased by sizable sums. For an OEM, warranty management is a subset of after-sales service and repair processes. However, when broken down into sub-processes, it is seen that warranty management is much more than administering claims and payments between the OEM and its service providers and suppliers. Warranty processes are linked to many other business processes ranging from warranty registration to supplier collaboration and recovery, and the processes cover the entire value chain from service providers' customers to OEM's suppliers. Supporting these warranty and other functions requires robust computer applications for processing claims, reporting and analytics.

From an industry perspective, warranty management represents a major cost to OEMs and their suppliers, while simultaneously providing a revenue stream to dealers and the authorized repair networks. In some cases, dealers depend on warranty work to contribute an estimated 5-25% of the dealership's profits. Further, warranty-related costs are increased by the growing complexity of products, expansion of available warranty coverage and increasingly longer warranty periods. Warranties may also be a key contributor to customer satisfaction and loyalty, and can generate additional revenues via extended warranty sales. As seen in Table 1 below, warranty-related costs may account for a non-negligible percentage of a business's product sales.

TABLE 1

Example of Warranty Cost per Industry

| Company | Warranty Cost in 2004 ($ millions) | Warranty as % of Product Sales |
|---|---|---|
| Hewlett-Packard Co. | 2.365 | 3.70% |
| Dell Inc. | 1.103 | 2.60% |
| IBM Corp. | 802 | 2.60% |
| Motorola Inc. | 387 | 1.30% |
| Cisco Systems Inc. | 366 | 2.10% |
| Nortel Networks | 349 | 4.40% |
| Sun Microsystems Inc. | 341 | 4.80% |

In the past, warranty-related problems have been considered an isolated matter. However, despite the increasing criticality of warranty management, many OEMs and suppliers still treat warranty management as an administrative function supported by poorly integrated legacy systems, highly manual business processes and organizations. Additionally, many companies that sell products to consumers, such as consumer electronics, outsource the technical repair of their products, and the service for such repairs is often provided by small, independent shops. Existing controls of repair work orders (WO) at such service providers are often poor, opening the door for fraud. Fraud typically consists of reporting fictional repairs by submitting product serial numbers for products that have not been repaired, providing services to products out of warranty (e.g., more than 1 year), overcharging for the repair, and the like.

Therefore, there is a need for improved mechanisms for managing and executing warranty-related intake, validation, invoicing and reporting processes and tools.

BRIEF SUMMARY OF THE INVENTION

In accordance with one embodiment of the present invention, a warranty management data processing system, method, and computer program are provided for determining relationships of data associated with warranty claims. Warranty data for a plurality of products is received and stored, and warranty service providers file repair/replace warranty claims against the warranties for the corresponding products. The repair/replace warranty claims are processed and repair/replace claims data is generated. The stored warranty data and the repair/replace claims data are analyzed, and a graphical representation of a distribution of the repair/replace claims data for one of the warranty service providers is generated.

In one aspect of the present invention, the distribution of the repair/replace claims data includes a distribution curve of a differential of sequentially ordered serial numbers for the warranty claims filed by one the warranty service providers. The distribution of the repair/replace claims data may alternatively include a distribution curve of a differential of serial numbers, ordered as they were filed by the warranty service provider.

Further, the graphical representation may also include a distribution curve of a differential of sequentially ordered serial numbers for the warranty claims filed by all of the warranty service providers, and the distribution curves are they compared. In yet another aspect of the present invention, the graphical representation also includes a distribution curve of a differential of sequentially ordered serial numbers for theoretical warranty claims, and the distribution curves then are compared.

The distribution of the repair/replace claims data may alternatively include a distribution of product ages for the products of the warranty claims filed by the warranty service provider. Still further, the distribution of the repair/replace claims data includes a distribution of spare parts data for the products corresponding to the warranty claims filed by the warranty service provider.

DETAILED DESCRIPTION OF THE INVENTION

A. Warranty Management System Overview

Figure 1:
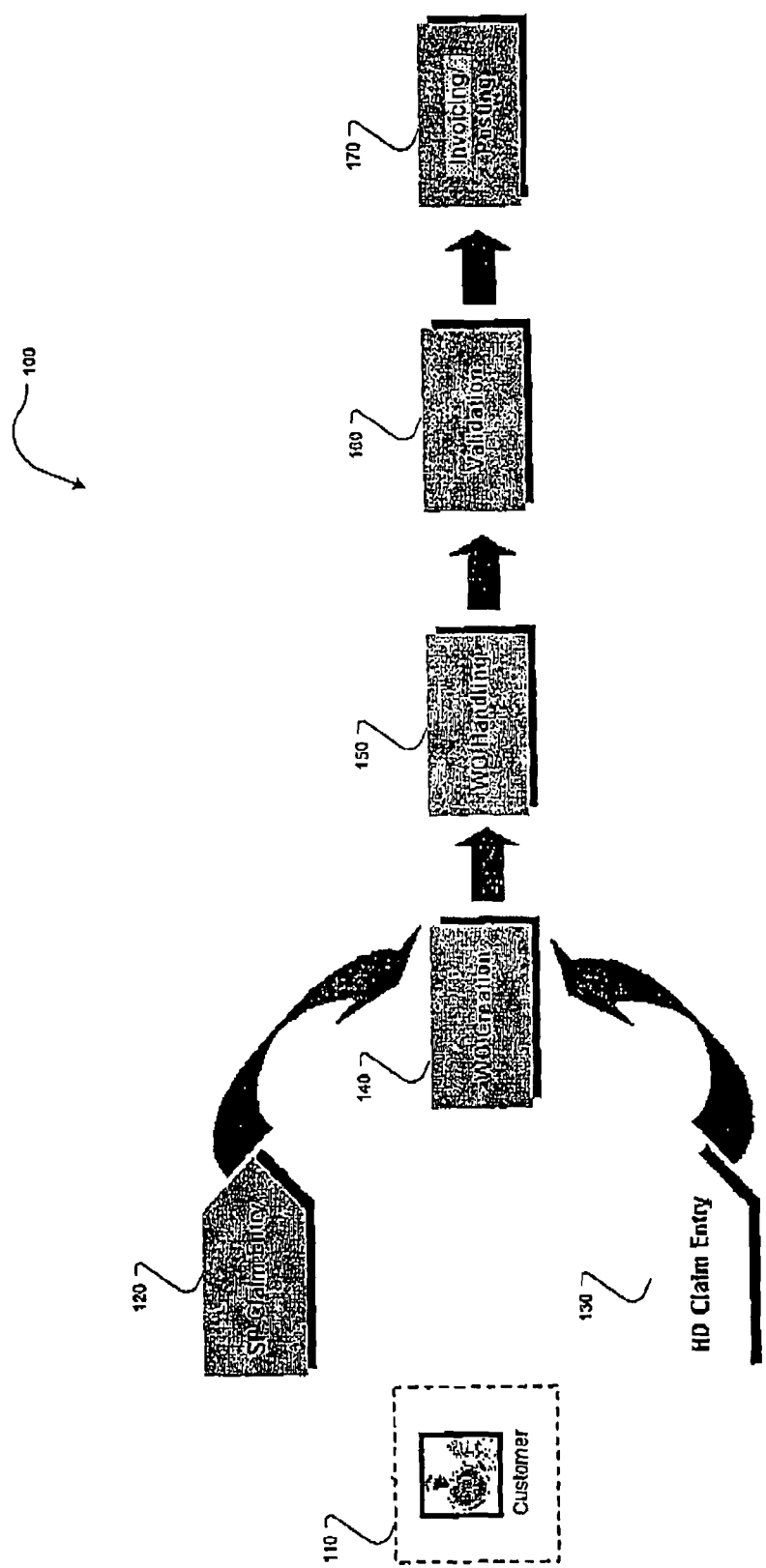
FIG. 1 is a diagram of an exemplary flowchart of the warranty management framework in accordance with one embodiment of the present invention.

Various embodiments of the present invention as described herein may be designed and developed as part of a Warranty Management System. As used herein, "Warranty Management System" refers to both a framework methodology and an electronic tool that facilitates implementation of the framework methodology. The warranty management system framework methodology includes a collection of warranty management best practices that have been aggregated to provide a structured yet flexible system for managing and executing warranty-related intake, validation, invoicing and reporting tools. Further, in certain embodiments of the present invention, the warranty management system may be tuned for key industry teams where appropriate.

Other aspects of the present invention may be implemented as stand alone programs that are run in connection with such a warranty management system in order to analyze the system's claim data. These aspects may be used separately or in a combination to leverage warranty claim data to detect: (1) the likelihood of fraud, (2) issues in service quality, and/or (3) issues in product quality. In some embodiments, certain aspects of the invention are instantiated as C++ programs, Microsoft Access databases, or Microsoft Excel spreadsheets. One skilled in the art will recognize that other suitable programming languages and other software may be applied to make or use the invention.

The present invention is uses warranty claims data received from service provider work orders to detect potential fraud and to acquire product quality information. In one embodiment of the invention, service providers upload warranty claims, which are subsequently analyzed by a client validation tool of the warranty management system against a set of warranty rules and are assigned a violation code for each irregularity found. Validators, human or electronic, may review the identified irregular claims on a daily basis and take action (approve or deny) based on a set of warranty rules signed by the service provider that determine valid warranty repairs. Findings in the validation analysis, such as detection of strange patterns, may be communicated to a warranty data analysis team. The foregoing warranty data analysis process is responsible for fraud detection and may include reporting, statistical analysis and drill-down analysis functionality.

In one embodiment of the present invention, the warranty management system includes a centralized control of a whole continent area warranty operation. Other suitable region designations may be used where appropriate. The system provides controls for warranty claims approval and payment processes, which ensures that only claims complying with the warranty rules are paid. The system also standardizes validation processes, and the system reporting functionality allows for warranty claims comparisons between countries/regions. The system provides functionality for identification of potential malpractices and fraud, thereby providing accurate data to optimize the operations of the repair services network. Finally, the system of the present invention ensures that the warranty activities are reported regularly to provide product development departments with accurate and timely feedback regarding the quality of their products.

B. General Warranty Management System Flow

Referring to FIG. 1, a high-level warranty management process 100 is shown, beginning with a customer making a warranty claim 110. For products and parts sold to customers, the OEM or distributor is typically responsible for handling the warranty. Accordingly, warranty management is one of the customer services the manufacturer or distributor provides through a help desk or selected third party repair vendors (service provider or authorized service center, "ASC", used herein interchangeably). A warranty claim lifecycle may be initiated when customer makes a warranty claim, step 110, by contacting directly a service provider or calling the manufacturer's or distributor's help desk about a malfunction relating to a product that was sold to the customer. A warranty claim is then entered either by the service provider, step 120, or the help desk, step 130. These two scenarios represent the two traditional claim entry channels, but those skilled in the art will appreciate that other methods for receiving warranty claims may be used within the framework of the present invention.

Where a customer directly contacts a service provider to enter a warranty claim, step 120, a work order is created, step 140, in a service provider system. As described in more detail below, the work order may be created through a number of systems and user interfaces. A service provider representative receives and enters the requisite information of the warranty claim. After the warranty data is correctly entered by the service provider representative, the work order may be created and sent forward through the warranty claim process, step 150. Data consistency and further checks are subsequently performed, as described in more detail below.

Where a customer calls the manufacturer's or distributor's help desk, step 130, a help desk representative acquires warranty data from the customer and enters it through an interface for the simulation of an external electronic document. Automatic data checks are performed in the interface and, if successful, a work order is created in the system, step 140, and the work order is sent to the service provider. Upon receipt of the work order, the service provider may either accept or reject it.

In both of the foregoing scenarios, where a warranty claim is entered either by the help desk or by the service provider, if the work order passes all the predefined checks and the service provider accepts it in case of a help desk work order creation, the service provider initiates work order handling, step 150. During work order handling, step 150, the service provider may insert materials into the work order, cancel the work order, or claim the work if the ordering stage for the service provider is completed. The service provider further manages status updates for a work order (e.g., "Repair Started," "Repair Finished," or "Claimed" status). By setting work order status to "Claimed" the service provider closes its side of the work order and sends it in the next loop for validation readiness, where the work order is submitted for validation, step 160, comprising first automated validation checks and subsequently, where deemed appropriate, manual validation checks.

Manual validation controls and actions within the warranty management system may be managed or implemented by a variety of human actors. In one embodiment, a manufacturer or distributor may be responsible for effecting such validation. Alternatively, a third party validation center or consultant may provide such validation services and processes. Such validation centers or consultants may either be centrally located or operations may be stationed in the country responsible for providing the warranty services or receiving the warranty claim. In any of the foregoing arrangements, the party responsible for validation may involve service providers with validation processes when it is required.

Finally, upon validation and approval of work orders, the corresponding claims may be posted and invoiced, step 170. A service provider may group warranty claims for submission on a daily, weekly, bi-weekly, or monthly basis, or by another suitable grouping. Claims may be first pre-posted and grouped in order to reduce the number of invoices and postings. When claims are invoiced via the warranty management system, two processes may be managed: (1) credit-note like or self invoicing approach, or (2) normal invoicing approach. A decision of which invoicing approach to implement may be formed on a service provider-level or a country-level and may depend on a country's business and legal requirements. Once invoice processing is completed, the attendant accounting documents are posted.

Figure 2:
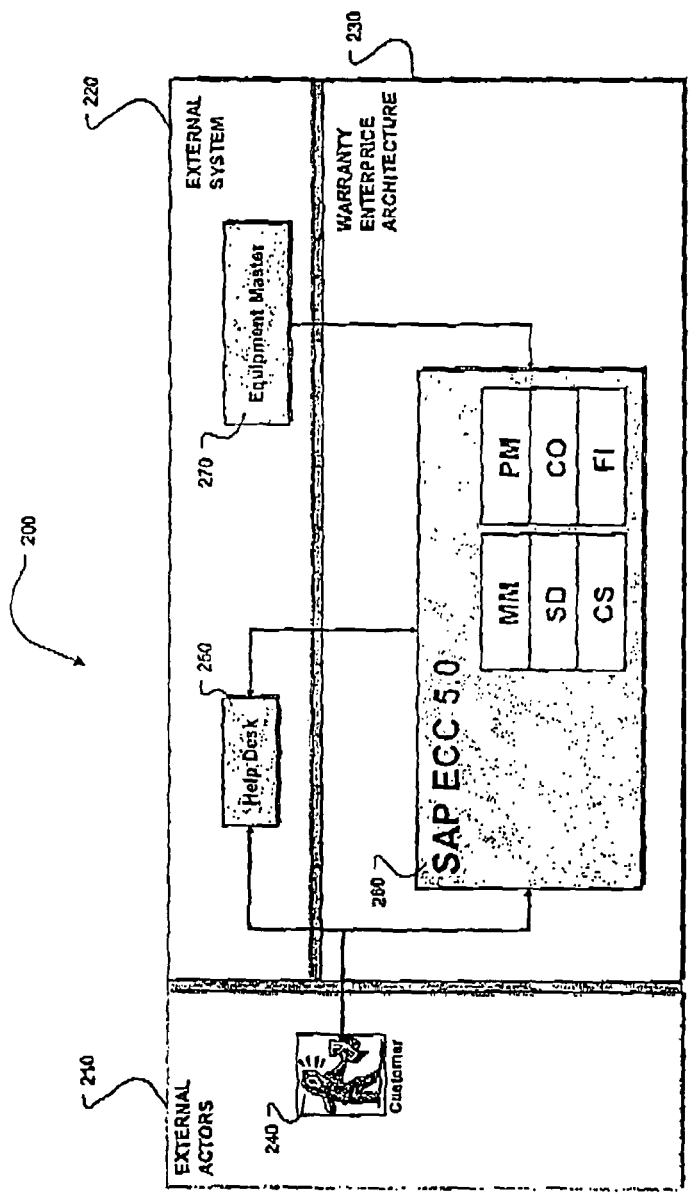
FIG. 2 is a schematic representation of the warranty management system application architecture in accordance with one embodiment of the present invention.

FIG. 2 is a schematic representation of the warranty management system application architecture 200 in accordance with one embodiment of the present invention. The architecture includes interfaces for external actors 210 such as customers 240, which may include individual consumers, corporate clients, and other product end-users or purchasers. The external actors 210 communicate with external systems 220 such as a help desk 250 or another entity that receives the warranty claims data. Equipment master 270 module performs claims processing and may include a custom table implemented to simulate a system utilized to manage equipment data and warranty data. The equipment module 270 includes numerous interfaces between the equipment master 270 and a system 260, described below, for receiving claims data. The equipment module 270 further converts and maintains accurate warranty data and business rules.

A warranty enterprise architecture 230 may either be provided by the manufacturer or may be provided by a third part warranty management service provider. The warranty enterprise architecture 230 receives claims and may include interfaces for receiving and processors for converting and maintaining accurate warranty data and business rules. The systems of the warranty enterprise architecture 230 perform warranty claims processing and may include legacy systems that contain master data on equipment, customers, dealers, suppliers, part pricing, labor rates, defect codes, standard repair times, financial and accounting systems, and the like. The warranty processing may be integrated with and supported by an enterprise's SAP R/3 or other suitable system 260, including warranty management module (WTY), master data management modules (MM-materials and vendors, SD-customers, CS, PM-layout, catalog, control data, pricing, etc.) and posting FI documents (FI/CO), including posting accounting documents (credit memos and debit memos) and posting profit center documents and controlling documents.

B. Validation

As previously described, the warranty management system provides for automated and manual validation of warranty claims data received from service providers. The warranty management receives the warranty data from service providers for a plurality of products and stores the data in a storage medium. Initial claims validation may include performing various validation actions on the claims received from service providers. As seen in table 2 below, one set of such warranty claims data received from service providers and the corresponding validation actions are provided, including logical checks on predefined fields.

TABLE 2

Example of Logical Checks

| Field | Action |
|---|---|
| ASC Number | Reject non valid and non active ASC claim files. |
| Repair activity | Reject WO with non valid repair activity. |
| Repair activity | Reject WO with non authorized repair. |
| Sold-to-country | Out of country WO put on hold. |
| Repair date | Reject WO if non valid dates. |
| Part number | Put WO on manual validation if the same part is used multiple times in the same repair |
| Defect Codes | Reject WO with non valid defect codes. |
| Part Number | Reject WO with non valid part numbers. |
| Part Number | Allocate part reimbursement only when part was replaced. |
| Repair action | Reject non valid repair actions. |

Figure 3:
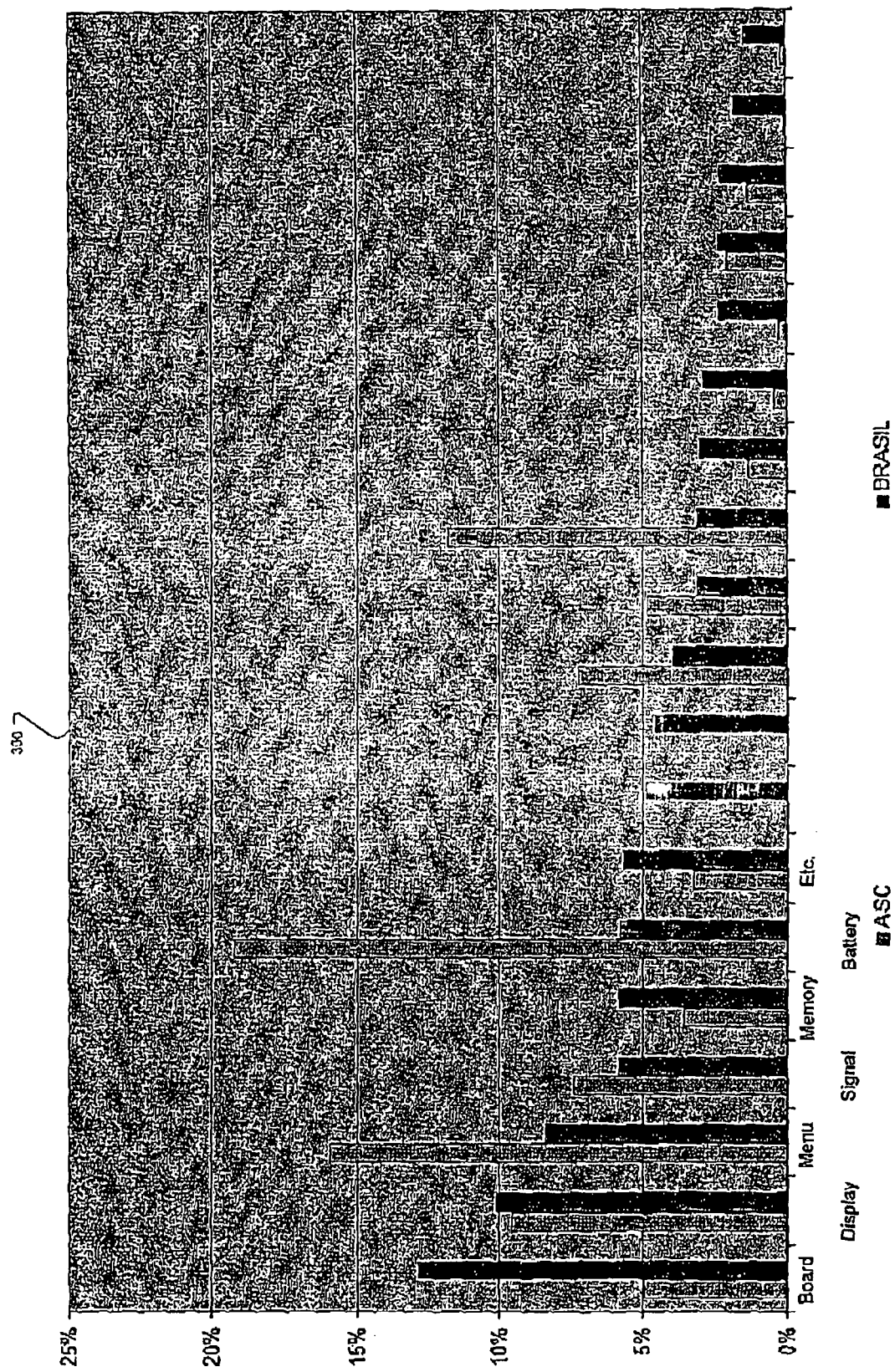
FIG. 3 is an exemplary chart generated by the warranty management system presenting type of diagnosis incidence per ASC data for a telephone product.
Figure 4:
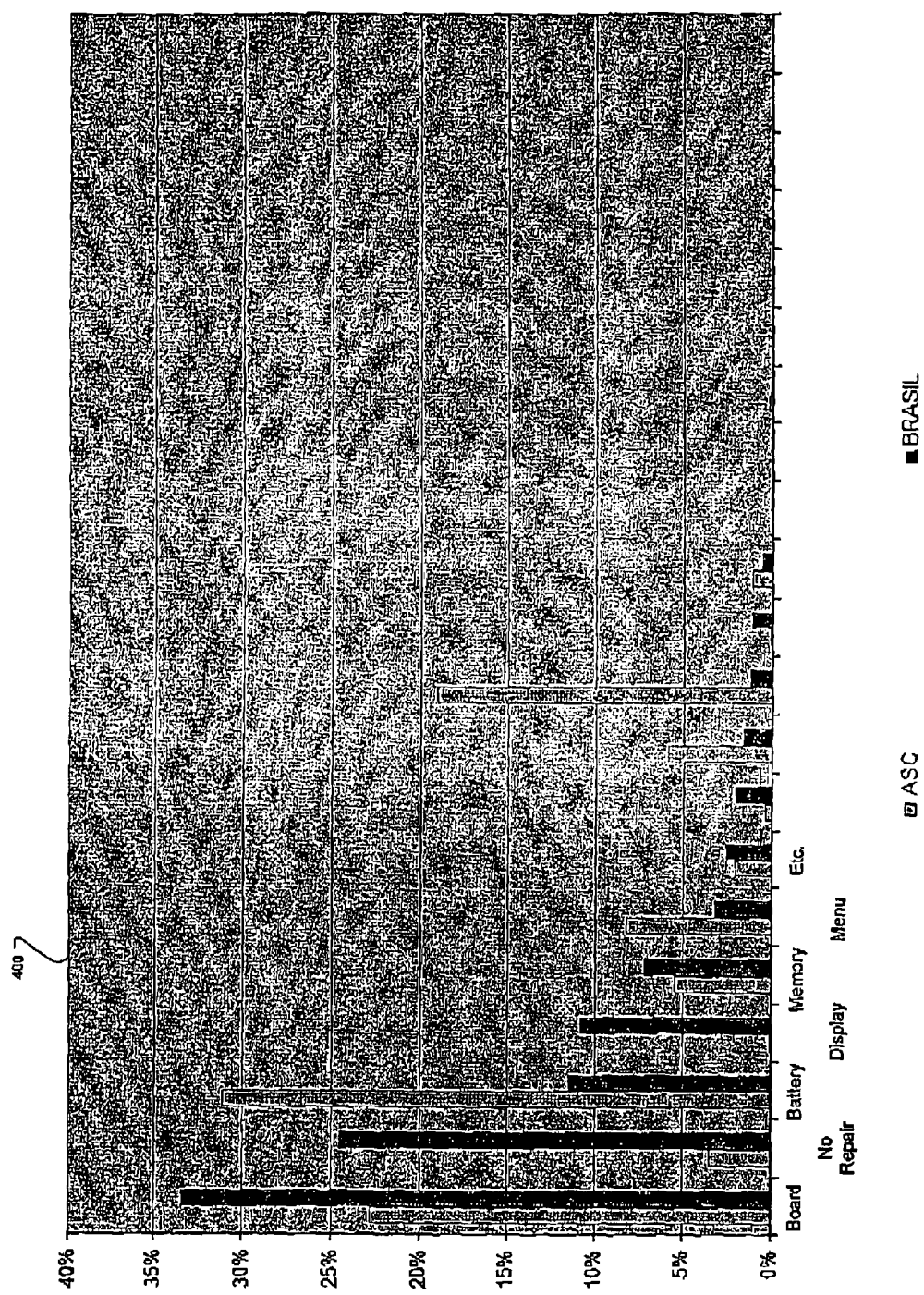
FIG. 4 is an exemplary chart generated by the warranty management system presenting type of repair incidence per ASC data for a telephone product.

From the foregoing warranty claims data and other related information received pertaining to warranty repairs, the warranty management system performs reporting and analysis functionality to identify potential fraud or abnormalities. In one report, the warranty management system graphically or otherwise presents the type of diagnosis incidence per ASC. Referring to FIG. 3, chart 300 displays type of diagnosis incidence per ASC data for a telephone product. The resultant analysis of the chart verifies the distribution of the type of diagnosis a service center reports and compares it with regional and/or country patterns. Where certain diagnoses are notably different, further inquiry of the ASC ensues. For example, the menu diagnosis and battery diagnosis for the ASC shown in chart 300 are markedly higher than its country counterparts. In another report, the warranty management system graphically or otherwise presents the type of repair incidence per ASC. Referring to FIG. 4, chart 400 displays type of repair incidence per ASC data for a telephone product. The resultant analysis of the chart verifies the distribution of type of repair a service center reports and compares it with regional and/or country patterns. For example, the battery repairs are markedly higher and the number of "no repairs" are markedly lower for the ASC shown in chart 400 than its country counterparts.

Figure 5:
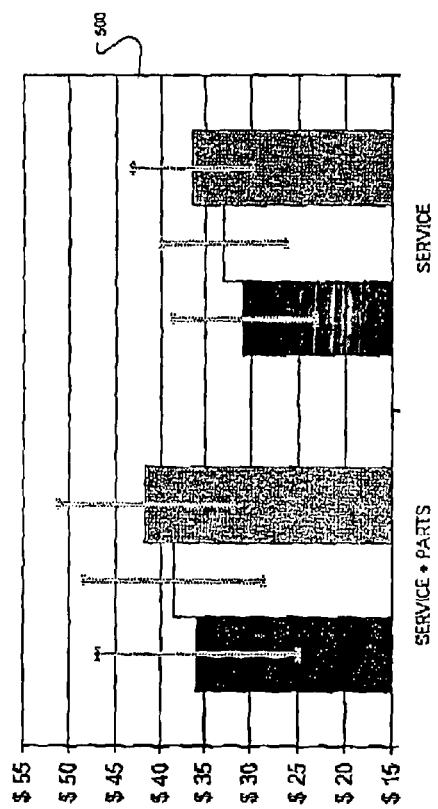
FIG. 5 is an exemplary chart generated by the warranty management system presenting distribution of repair value per ASC data for a selected product.
Figure 6:
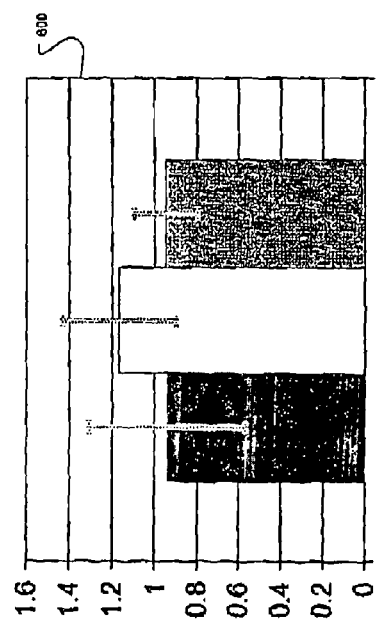
FIG. 6 is an exemplary chart generated by the warranty management system presenting quantity of materials repaired per ASC data for a selected product.
Figure 7:
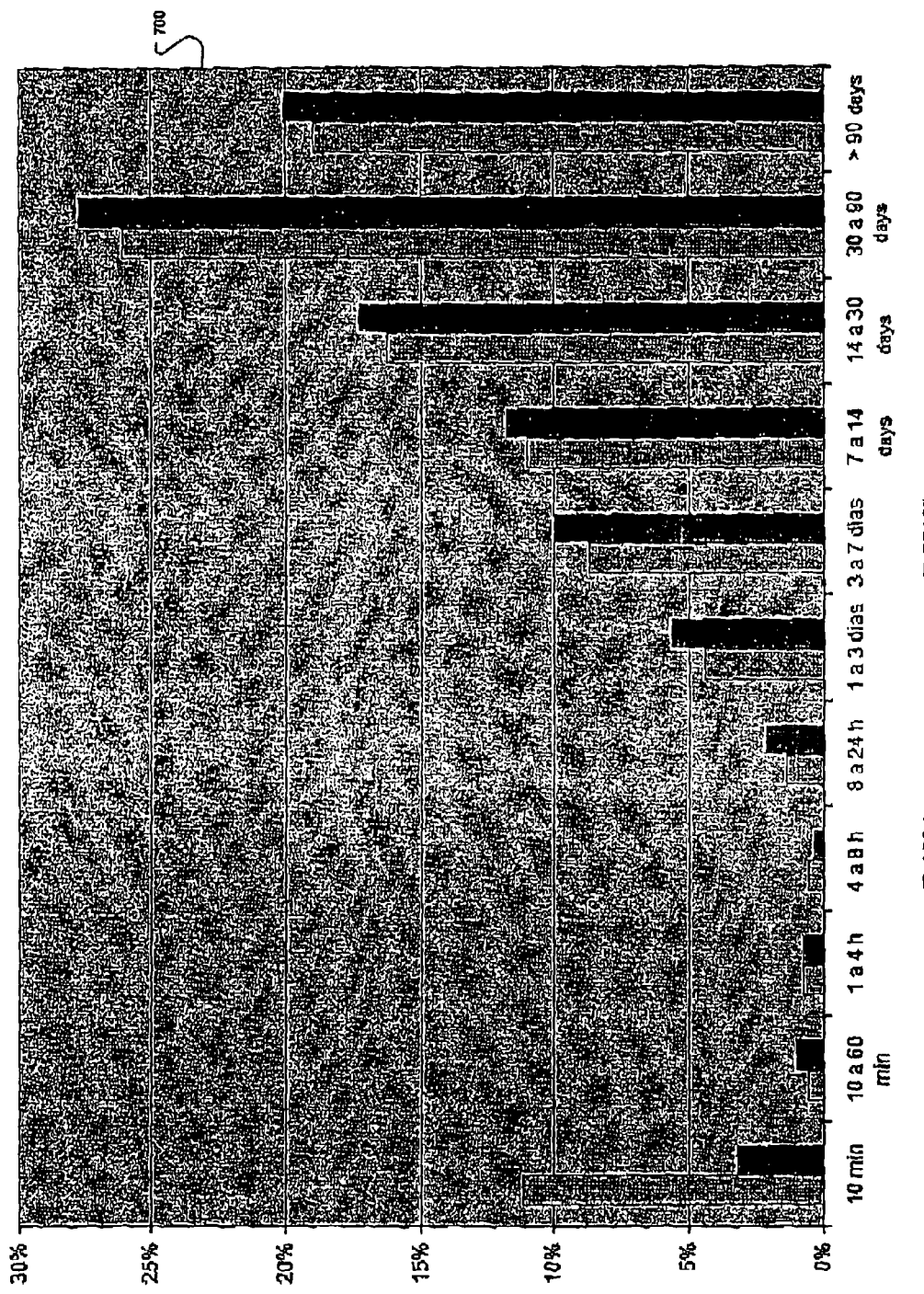
FIG. 7 is an exemplary chart generated by the warranty management system presenting mean time between repairs per ASC data for a selected product.

Another report of the warranty management system graphically or otherwise presents the repair value per claim, both for service and materials, per ASC. Referring to FIG. 5, chart 500 displays the total warranty claim cost breakdown, both for services with parts and services without parts, per ASC for a selected product. The resultant analysis of the chart verifies the distribution of repair value per ASC and compares it with regional and/or country patterns. For example, both the service and the service-plus-parts costs are markedly higher for the ASC shown in chart 500 than its country and regional (group) counterparts. The value of the repair may also be assessed by comparing the cumulative amount spent by an ASC per product, for both service and parts, against the product cost. Still another report of the warranty management system graphically or otherwise presents the quantity of materials repaired per ASC. Referring to FIG. 6, chart 600 displays the quantity of materials repaired per ASC for a selected product. The resultant analysis of the chart verifies the distribution of quantity of materials repaired per ASC and compares it with regional and/or country patterns. In yet another report, the warranty management system graphically or otherwise presents the mean time between repairs (MTBR) per ASC. Referring to FIG. 7, chart 700 displays the MTBR per ASC for a selected product. The resultant analysis of the chart verifies within the bounce occurrences for an ASC and compares it with regional and/or country patterns.

C. Serial Number Distribution Curve Reporting and Analysis Functionality

The warranty management system provides for automated and manual reporting and analysis that provides for data mining procedures that include analytical, statistical and mathematical tools that analyze claims and service provider data. These tools deepen the understanding of ASC claims information by finding previously unobserved relationships in the masses of claim data received from the ASCs. The reporting and analysis may be performed without pre-existing information regarding fraud, claims, or ASCs. Thus, human opinions or suspicions do not affect the results of the automated analysis, but rather the results are based on the facts presented by the data.

The serial number distribution curve functionality analyzes sequences of product serial numbers that appear in warranty claims. Although the analysis is described herein with respect to product serial numbers, any identifying product indicia, numeric or otherwise, that is capable of being sequenced, may be used within the spirit and scope of the present invention. The analysis yields fraud detection, product quality findings, reporting findings, and the like. The analysis, as described herein, effectively creates a visualization of the distribution of differences of consecutively claimed serial numbers (the claimed serial numbers need not be consecutive, but the consecutively claimed serial numbers may be ordered as described below); i.e., the warranty management system determines how close serial numbers submitted with claims are to each other and establishes a distribution curve of the serial number proximities. The results are compared to average or baseline distributions to uncover abnormalities in the serial numbers submitted with warranty claims. When serial number distribution of a service provider's claims differs more than a predetermined acceptable level from baseline, further investigation is initiated by the warranty management system.

When warranty claims are submitted by a service provider repair company, such analysis of the attendant serial numbers may detect when the service provider is attempting to collect on claims for which no work was actually performed by generating fraudulent repair claims by adding small random or constant numbers to the serial numbers of valid repair claims. By including, inter alia, a visual component to the analysis of sequentially submitted serial numbers the warranty management system affords flexible validation that can detect other types of fraud attempts and provides rapid processing of a large volume of service providers and claims, allowing the system to then concentrate on the more suspicious ones. Moreover, including a visual analysis component, the resultant validation includes support material for subsequent audits.

In one aspect of the serial number analysis, the difference between consecutive serial numbers of submitted warranty claims from a service provider are plotted against a percent of claims from a service provider. The resultant graph is then compared against baseline data, which may include the data from all service providers or the service providers from the same geographical region, or against known valid warranty claims. From these graphs, the analysis assesses the Y-axis crossing points (difference between consecutive serial numbers) and the corresponding X-axis value (percent of warranty claims). For example, where the baseline, or "normal" service provider, yields and expected 12% of the warranty claims with a difference smaller than 10 (Y-value) and in the subject service provider the X-value is 32%, fraud in 20% of the subject service provider's claims may be determined.

In another aspect of the serial number analysis, the curve shape may suggest fraudulent warranty claims data. Specifically, linear sections, steps and other uneven shapes often indicate irregular warrant claims. On a logarithmic scale, the distribution of valid claims data typically follows a smooth S-curve without any irregularities in shape. Alternatively, the distribution can follow the shape of a logarithmic curve where the Y-axis value increases in decreasing steps as a function of X.

Figure 8:
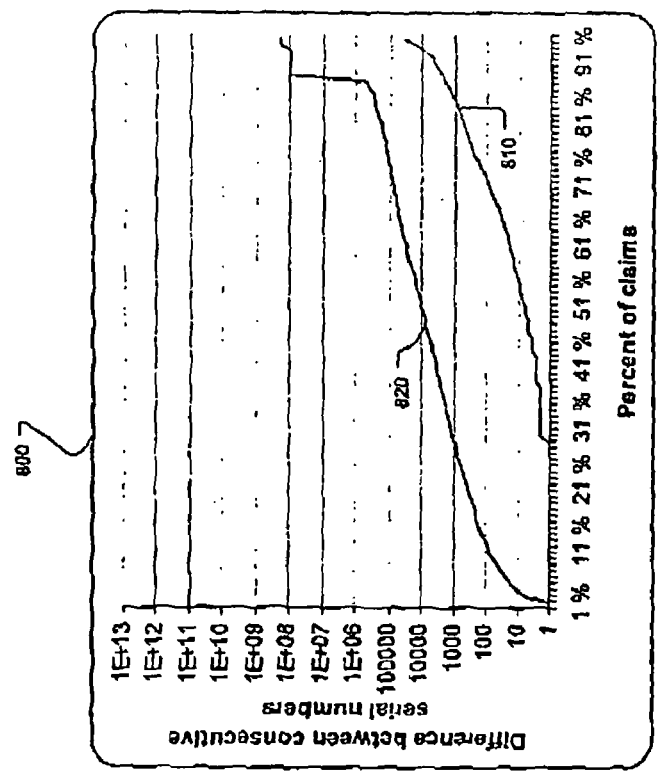
FIG. 8 is an exemplary graph generated by the warranty management system presenting the differential between sequential serial numbers from warranty claims data as a function of the percent of claims for an ASC.

By implementing the foregoing methodology, the warranty management system can identify fraudulent warranty claims when odd behavior of a graphed sustain curve is a "low-curve." Such a curve suggests that fraudulent serial numbers were generated by the service provider by adding a small random or constant number (e.g. 1-10) to the previous serial number. With reference to FIG. 8, an example of fraudulent claims data is shown on a graph 800 in accordance with one embodiment of the present invention where numerous consecutive serial numbers are submitted in a service provider's warranty claims (i.e., serial number difference=1). Specifically, service provider serial number distribution curve 810 is compared against benchmark serial number distribution curve 820. From the graph 800, it is observable that approximately 25-28% of the service provider's claims, curve 810, are in direct sequence (e.g. serial numbers 123, 124, 125, 126, 127 . . . ) which is not plausible for valid and legitimate warranty claims. Moreover, when compared to the benchmark claims curve 820, the service provider curve 810 shows that more than 50% of the service provider's serial numbers have a difference smaller than 10 whereas the benchmark curve 820 shows the expected proportion of such claims (difference smaller than 10) to be about 5%.

Figure 9:
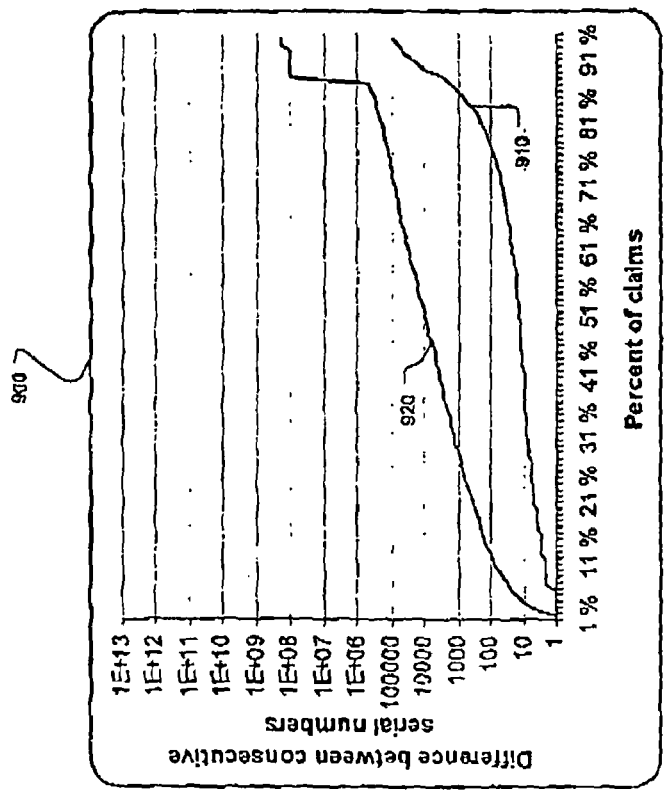
FIG. 9 is another exemplary graph generated by the warranty management system presenting the differential between sequential serial numbers from warranty claims data as a function of the percent of claims for an ASC.

With reference to FIG. 9, an example of fraudulent claims data is shown on a graph 900 in accordance with one embodiment of the present invention where the serial numbers are not consecutive, but the ascending serial numbers of the submitted warranty claims have differences of 2-10. As generally observed in graph 800, graph 900 also shows a suspicious service provider curve 910 compared against benchmark curve 920, where the service provider's serial numbers are more closely grouped than the benchmark's serial numbers. Specifically, in graph 900 it is observable that approximately 80% of the service provider's serial numbers 910 have a difference smaller than 100 whereas the benchmark curve 920 shows the expected proportion of such claims (difference smaller than 100) to be about 15%.

Figure 11:
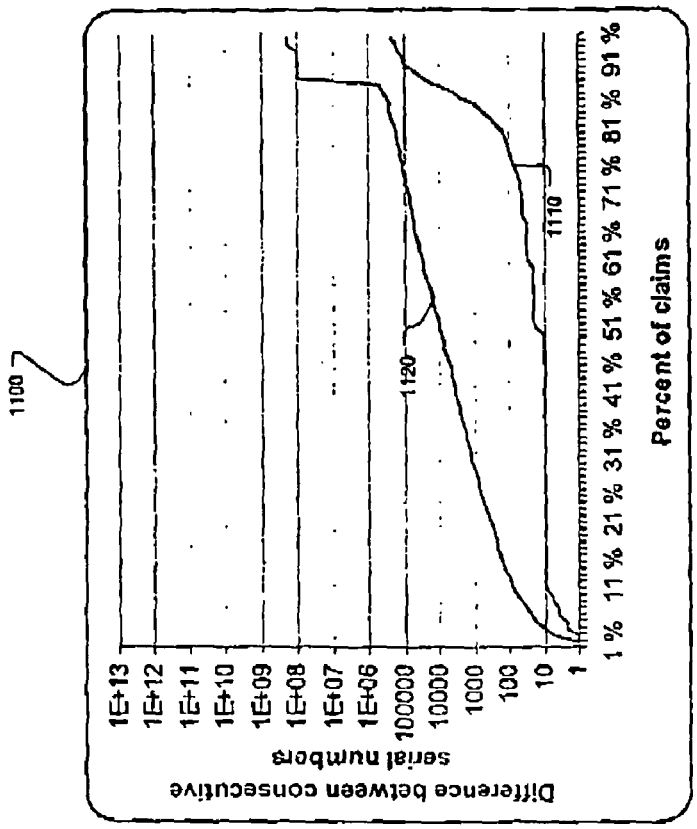
FIG. 11 is another exemplary graph generated by the warranty management system presenting the differential between sequential serial numbers from warranty claims data as a function of the percent of claims for an ASC.
Figure 10:
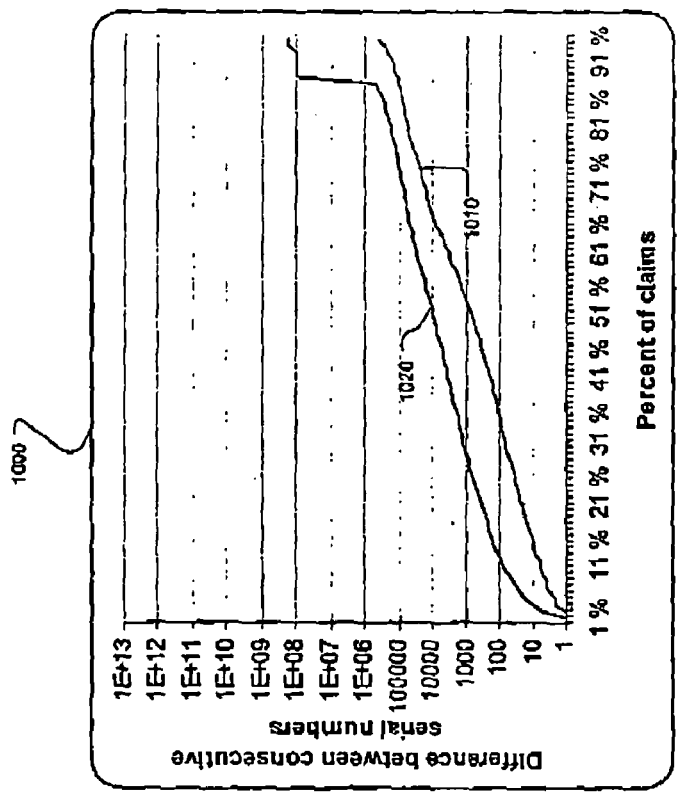
FIG. 10 is another exemplary graph generated by the warranty management system presenting the differential between sequential serial numbers from warranty claims data as a function of the percent of claims for an ASC.

Another type of fraudulently generated serial numbers may be observed as a "linear-curve". In this scenario, a service provider generates fraudulent serial numbers by adding a larger random number (e.g., 1-1000) to the previous serial number. With reference to FIG. 10, an example of such fraudulent claims data is shown on a graph 1000 in accordance with one embodiment of the present invention where the sustain curve of the service provider's serial numbers 1010 is substantially linear, particularly observable in juxtaposition to the benchmark curve 1020, thereby suggesting possible fraud. Yet another type of fraudulently generated serial numbers may be observed as a "flat-curve". In this scenario, a service provider generates fraudulent serial numbers by adding a constant number (e.g. 10) to the previous serial number. With reference to FIG. 11, an example of such fraudulent claims data is shown on a graph 1100 in accordance with one embodiment of the present invention where sustain curve of the service provider's serial numbers 1110 is substantially flat, particularly observable in juxtaposition to the benchmark curve 1120, thereby suggesting possible fraud. In graphs 1000 and 1100 it is shown that fraud may be suspected where the shape of the service provider's serial number curve is not a smooth s-curve but rather it is linear (graph 1000) or flat (graph 1100), which indicates that the serial number distribution is not random but has been created through user manipulation.

Figure 12:
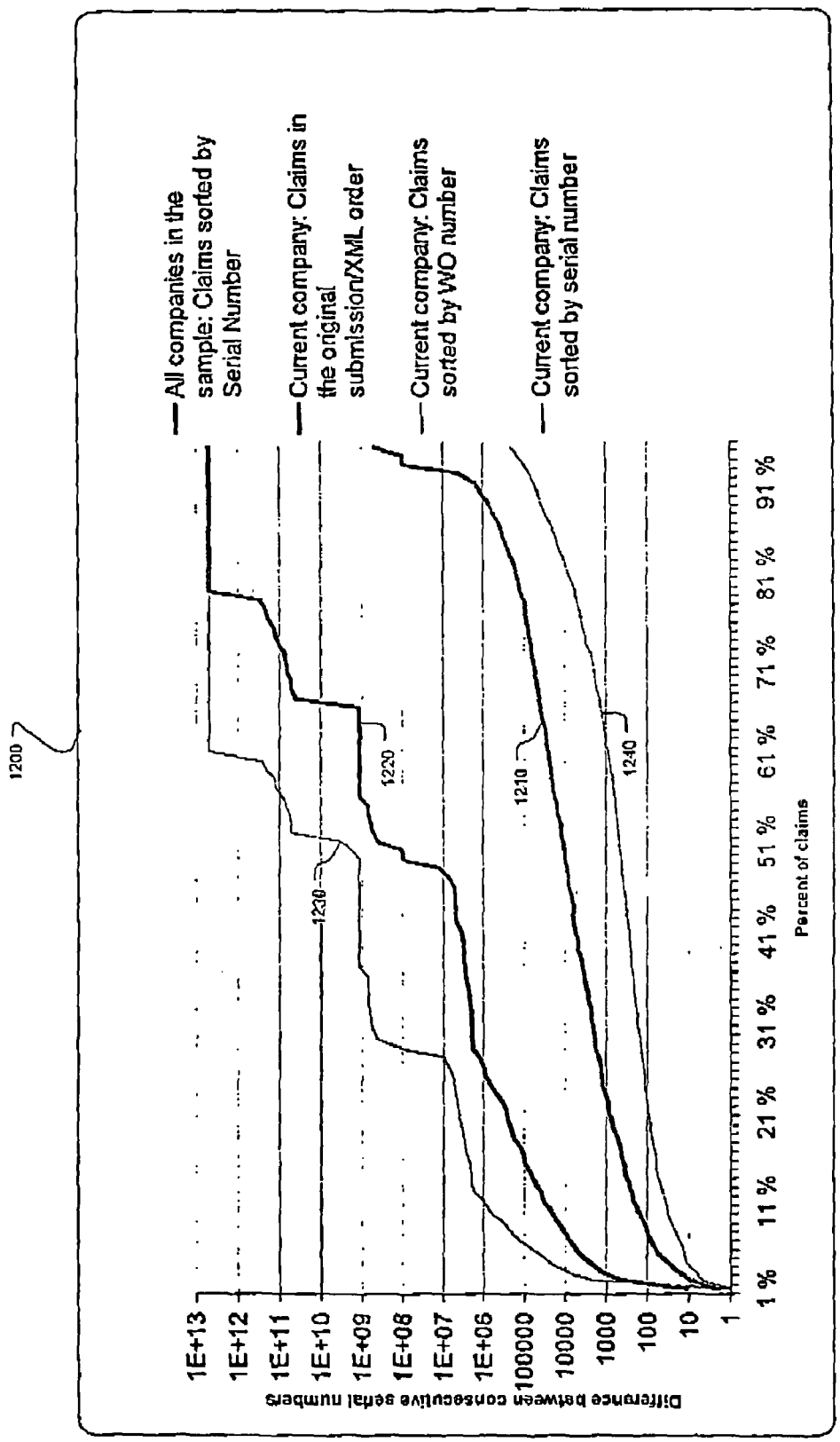
FIG. 12 is a exemplary graph generated by the warranty management system presenting the differential between serial numbers sorted by original submission, sorted by work order number, and sorted sequentially from warranty claims data as a function of the percent of claims.

Referring now to FIG. 12, another aspect of the invention is shown where the warranty management system generates a graph 1200 for displaying the differential between serial numbers sorted by original submission, sorted by work order number, and sorted sequentially from warranty claims data as a function of the percent of total claims. Line 1210 represents the difference between consecutive serial numbers from all service providers in a sample group, where the serial numbers are sorted sequentially. The sample group may be a country, other geographical region, or another suitable collection of service providers. Line 1210 functions as a benchmark or baseline against which other data is compared. Line 1220 represents the difference between consecutive serial numbers from the current subject service provider, where the serial numbers are sorted by their original submission by the service provider. Line 1230 represents the difference between consecutive serial numbers from the current subject service provider, where the serial numbers are sorted by their corresponding work order numbers and the work order numbers are sequentially sorted. Line 1240 represents the difference between consecutive serial numbers from the current subject service provider, where the serial numbers are sorted sequentially. Thus, the warranty management system graphically reveals that although a subject company's work order serial numbers sorted by submission and by work order number, lines 1220 and 1230 respectively, have some correlation and suggest a high differential between serial numbers, when the same company's work order serial numbers are sorted sequentially, they fall below the benchmark line 1210 and thereby suggest fraudulent serial numbers.

By sorting claims data by serial numbers, calculating differences between subsequent serial numbers, and identifying patterns in the data, fraudulent claims may be identified or valuable product quality information may be discerned from valid claims. Suspicious claims data patterns may trigger warnings, service provider auditing, additional reporting requirements, or other suitable responses.

The warranty management system provides a framework for structured analysis of serial number distribution curves. Because the curve distribution is a visualization of differences of consecutive serial numbers, correlated, or near-consecutive, serial numbers can be detected by differences in serial number distribution curves when compared to a "normal" curve, a medium curve, or distribution curve derived from theoretically fraudulent claims data. Serial number distribution curve analysis is typically performed for data that has not yet been analyzed. In one embodiment, the serial number distribution curve is derived from one month of claims data, but data from other suitable periods of time may be used as desired. The length of the study period will affect the interpretation of the results.

Figure 13:
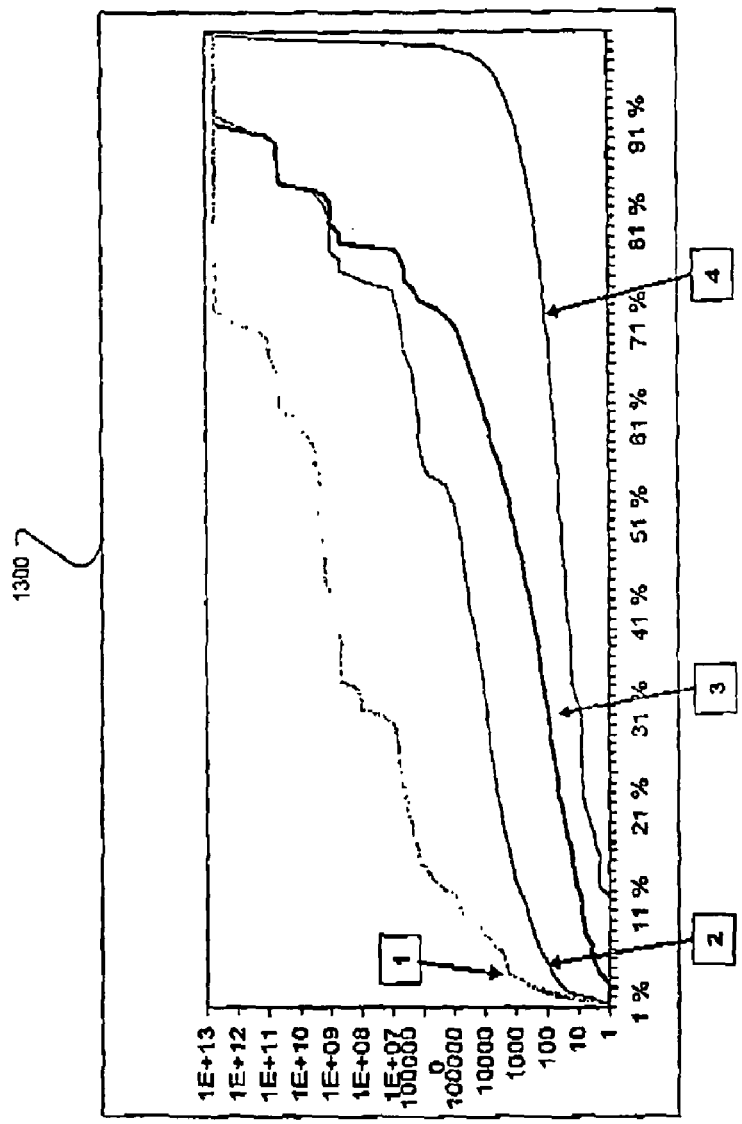
FIG. 13 is another exemplary graph generated by the warranty management system presenting the serial number distribution curves.

Referring now to FIG. 13, graph 1300 includes four distinct serial number distribution curves, Curve 1, Curve 2, Curve 3, and Curve 4. Curve 1 represents the distribution curve of serial numbers where 3 percent of differences between serial numbers are on average less than 1000, where the differences of consecutive serial numbers are calculated from the original arrival order of repair claims from the service provider or ASC, where difference=serial number "#N+1"—serial number "#N". Curve 2 represents the distribution curve of serial numbers where 5 percent of differences of serial numbers are less than 100, where the repairs are sorted by the work order number and differences are calculated from the sorted claims. Curve 3 represents the distribution curve of serial numbers where 30 percent of differences between serial numbers are less than 100, where the differences of consecutive serial numbers are calculated from the original arrival order of claims from the service provider or ASC. Curve 4 represents the distribution curve of serial numbers where 70 percent of differences of serial numbers are less than 100, where the repairs are sorted by the serial number and differences are calculated from the list of sorted claims.

Upon receipt of claims data from a service provider or ASC containing serial numbers, the aforementioned lines from FIG. 13 are generated by the warranty management system as follows. Curve 3, the "main" curve of an ASC, is provided for warranty claims in the original submission/XML order they are received from the ASC, and it is created through the following steps:

1) calculate difference of N serial numbers of the ASC to get a list A of N-1 differences {ABS[IMEI(1)−IMEI(0)], ABS[IMEI(2)−IMEI(1)], . . . ABS[IMEI(N)−IMEI(N−1)]}
2) sort the differences (list A) to get list B
3) plot the sorted differences (list B) on a logarithmic scale Curve 4, the "minimum" curve of an ASC is calculated by:
0) sort the claims first by serial numbers
1) 1-3) same steps Curve 2 of an ASC is calculated by:
0) sort the claims first by work order numbers
1) 1-3) the same Line 1 is median curve of all the other curves.

A theoretical serial number distribution curve may be generated that reflects suspected fraudulent warranty claim serial numbers. The theoretical serial number distribution curve can be used to simulate what a suspicious curve will look like in different situations: different field-failure-rate, market share, study period, warranty period, and the like. The theoretical curve can be used as one comparison point with a service provider or ASC reporting. The theoretical curve is compared with the "minimum sus-curve", i.e. the curve that is calculated from the list of sorted serial numbers.

In one embodiment, the theoretical curve is generated based on the assumption that the serial numbers shipped to a certain geographical area are in a sequence within a shipment. Where this assumption is not reasonable, the theoretical curve may be adjusted upward to more accurately represent the expected results. A service provider's market share of repairs in a particular area repairs may be a significant factor observed during analysis. However, absolute market size does not have major impact on sus-curve shape unless the product shipments to customers are very small. For example, in cases where one service provider repairs all phone products shipped to a customer or a service provider has a monopoly in a country or other geographical area, market share should be set to 100%. Theoretical distribution curves may be calculated by first defining a Field Failure Rate (FFR) for a certain product type repaired within selected sales area, or phones repaired by a selected ASC. The probability that two consecutive serial numbers differ by n is presented by the curve comprising the cumulative of the following probability distribution function, $G(n)=(1-FFR)^{(n-1)} * FFR$, where the adjusted FFR is the probability of a product being repaired by an ASC within the study period. In one embodiment, it is assumed that a product has equal probability to be repaired at all times during the warranty time.

D. Product Age-Curve Reporting and Analysis Functionality

In addition to manipulating and viewing serial number sequence data, the warranty management system may be further configured to analyze the distribution of product age at the time of repair. In one embodiment, the serial number distribution curve analysis is applied to many or all service providers. The product age-curve analysis is then performed to confirm or clear those service providers with abnormal or suspicious results of the serial number distribution analysis. In operation of the product age-curve analysis, each warranty claim submitted by a service provider includes sufficient data to determine the age of the product that is repaired. The product age distribution is then calculated and the distribution is compared to the average distribution of all claims to find abnormalities. The comparison supports fraud detection and also functions as an indicator of product quality or reporting issues.

Closely-groups sequential and consecutive serial numbers typically represent products of similar age. A large number of proximately claimed serial numbers thereby causes a graphical "peak" in the product age distribution. Borderline cases of fraud detected by serial number distribution curve analysis may be shifted, towards or away the likelihood of fraud, by the product age distribution analysis.

In a product age-curve analysis and report, the age of repaired products in a suspect service provider is compared against average service providers, all service providers, or some other suitable baseline curve. If the age of repaired products in the suspect service provider's claims varies significantly from an average distribution or predetermined acceptable distribution, fraud may be present. Typically age is calculated from the OEM shipping date from warehouse to the repair date. Other suitable dates may be used as well, including purchase date or initial customer claim date.

In one aspect of the product age-curve analysis and reporting, the warranty management system identifies that a substantial percentage of the repaired products are new. A product may be deemed "new" if it is 1, 2, 3, or 6 months old, or some other suitable age, which may be determined based upon the characteristics of the product or the term of the warranty. A high percentage of "new" products can indicate new, non-faulty products being "repaired" or reported as faulty ones when no repair was actually performed. Alternatively, a high percentage of new"products can indicate a faulty product.

In another aspect of the product age-curve analysis and reporting, the warranty management system identifies that a substantial percentage of the repaired products are old. A product may be deemed "old" if it is 12, 13, 14, or 24 months old, or some other suitable age, which may be determined based upon the characteristic of the product or the term of the warranty. A high percentage of "old" products can indicate out-of-warranty products being repaired with fraudulent purchase documents that incorrectly identify the product as still being under warranty.

In yet another aspect of the product age-curve analysis and reporting, the warranty management system identifies otherwise unexplained peaks in the age data of repaired products. Peaks suggest invented, fake warranty claims.

Figure 14:
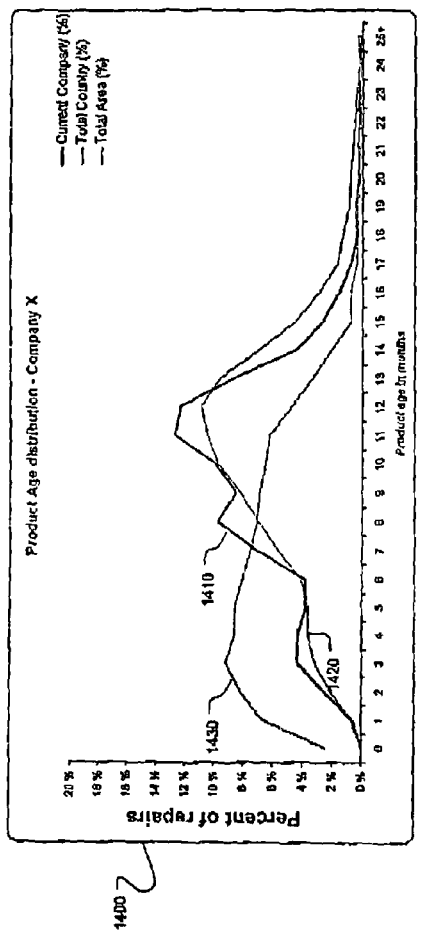
FIG. 14 is an exemplary graph generated by the warranty management system presenting the percent of repairs against product age for an ASC.

In one aspect of the present invention, the warranty management system generates a graph by plotting the percentage of repairs against product age, as seen in graph 1400 of FIG. 14. In graph 1400, line 1410 represents the repairs of a service provider, line 1420 represents the total repairs in the service provider's country including all other service providers in that country, and line 1430 represents the total repairs in the service provider's area including all other service providers in that overall area or region. Several peaks are apparent in the service provider's repairs, line 1410. When compared to the area/region curve 1430, the service provider's curve 1410 shows an abnormal age distribution that is not consistent with the normal age of failure for the products.

Figure 15:
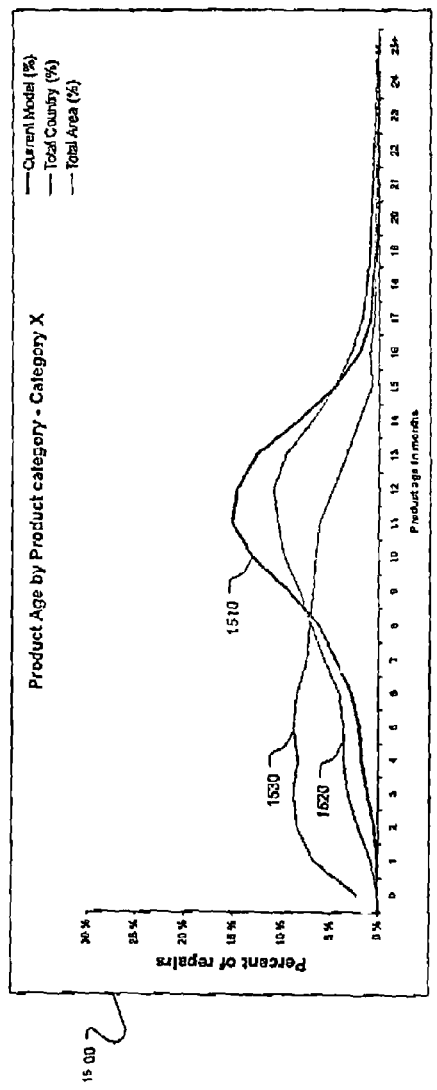
FIG. 15 is an exemplary graph generated by the warranty management system presenting the percent of repairs against product age by product category for an ASC.

FIG. 15 shows another aspect of product age-curve analysis and reporting. Graph 1500 shows a percent of repairs plotted against product age by product category, which thereby reveals valuable product quality data. Line 1510 represents the repairs of a model within the subject product category, line 1520 represents the total repairs in the product category in a subject country, and line 1530 represents the total repairs in the product category in a subject area or region. When compared to the area/region curve 1530, the product category curve 1510 shows an abnormal age distribution that is not consistent with the normal age of failure.

E. Spare Part Reporting and Analysis Functionality

The warranty management system may be further configured to perform spare parts price distribution reporting and analysis by analyzing the distribution of spare parts data discerned from the warranty claims. Where a warranty repair includes providing spare parts for the subject products, analyzing the service provider's corresponding spare parts price distribution data determines how expensive the spare parts used by the provider were. The service provider's spare parts price distribution is compared to an average distribution, or other suitable benchmark distribution, to find abnormalities in the service provider's spare part prices. Because similar service provider companies repairing similar products will use similar spare parts of similar price, instances of "peaks" in a graph of a provider's price distribution reflects an abnormal volume of low-cost or high-cost spare parts. Such systematic use of low-cost or high-cost spare parts is a fraud indicator, a product quality indicator, or a reporting issue, all of which are addressed by farther analysis of the suspect service provider, product, or report, respectively.

Figure 16:
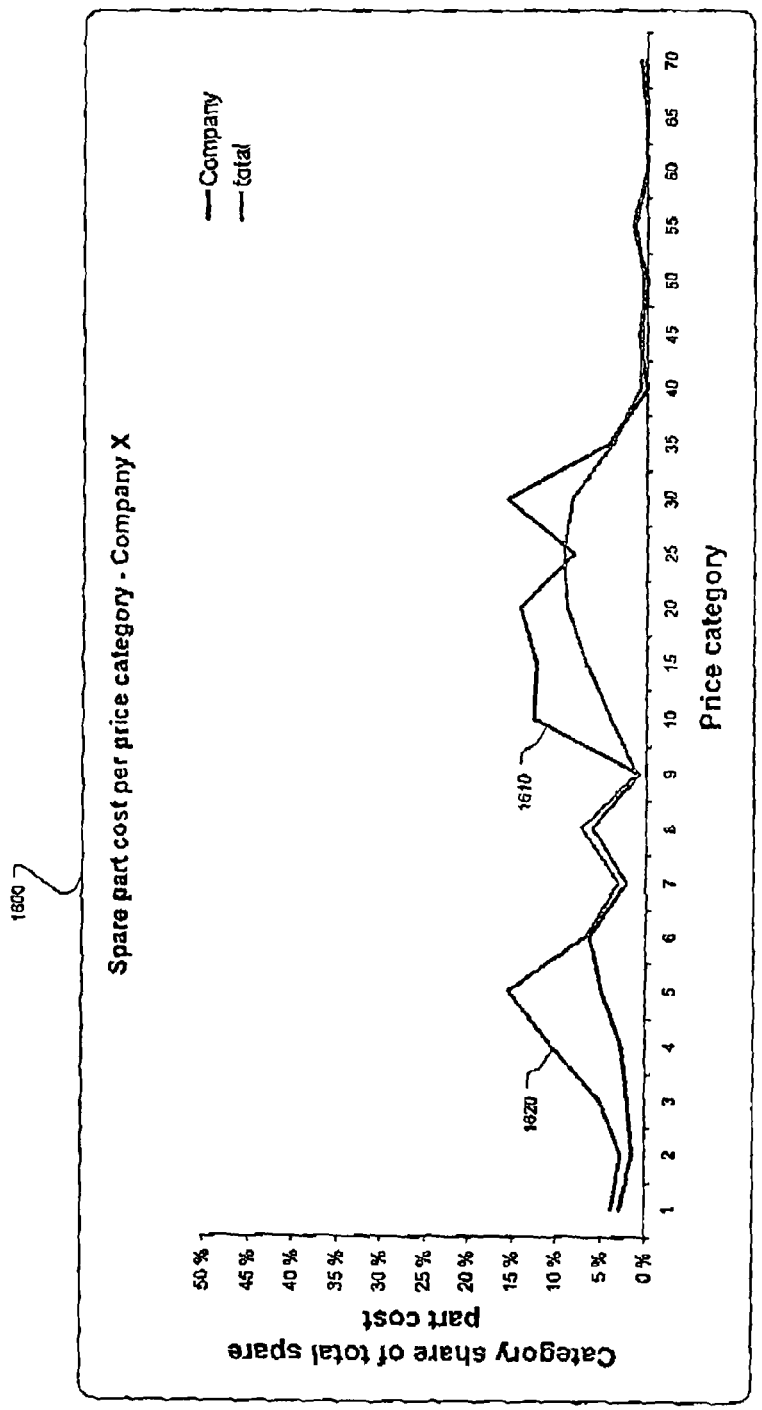
FIG. 16 is an exemplary graph generated by the warranty management system presenting the spare parts price distribution for an ASC.

FIG. 16 shows a graphical representation generated by the warranty management system, including a spare parts price distribution for a service provider, line 1610, as compared against spare parts price distribution for the total number of spare parts for all service providers, line 1620, in a selected group. Relatively low price spare parts price distribution is present at price 4-5 and a relatively high price spare parts price distribution peak is present at price 30. Such peaks and valleys are representative of fraud or product quality, and follow-up action to investigate the cause ensues.

Figure 17:
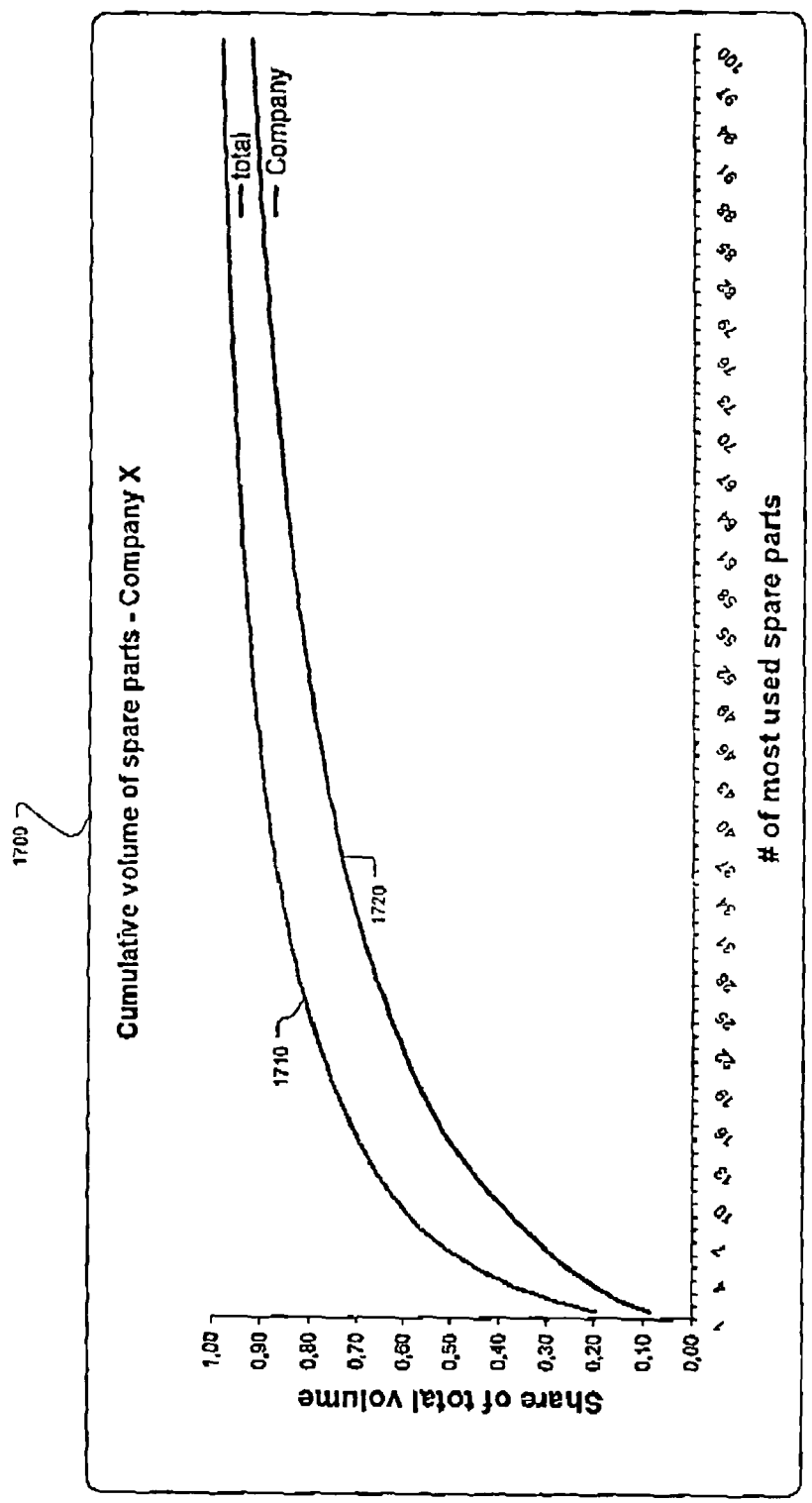
FIG. 17 is an exemplary graph generated by the warranty management system presenting the distribution of spare parts as a share of cumulative spare part volume for an ASC.

Further, the warranty management system may perform a report and analysis of the distribution of spare parts as a share of cumulative volume. This report and analysis tracks and identifies the share of spare parts volume that is attributable to the most common spare parts used in repairs. Thus, by comparing each service provider repair company to the average or other suitable baseline, abnormalities in a service provider's spare parts value distribution can be identified for further investigation. For example, when a service provider heavily uses only a limited number of different types of spare parts, the warranty management system will suggest further inquiry. FIG. 17 shows spare parts as a share of cumulative spare part volume for a service provider, line 1710, as compared against the total number of the spare parts for all service providers, line 1720, in a selected group. Specifically, service provider curve 1710 deviates substantially upward from benchmark curve 1720, which reveals that the service provider company in question is heavily using certain spare parts in its warranty claims, thereby indicating that its spare part usage is not normal and may be fraudulently inflated to increase warranty compensations. These abnormalities may alternatively indicate product quality or reporting issues.

Figure 18:
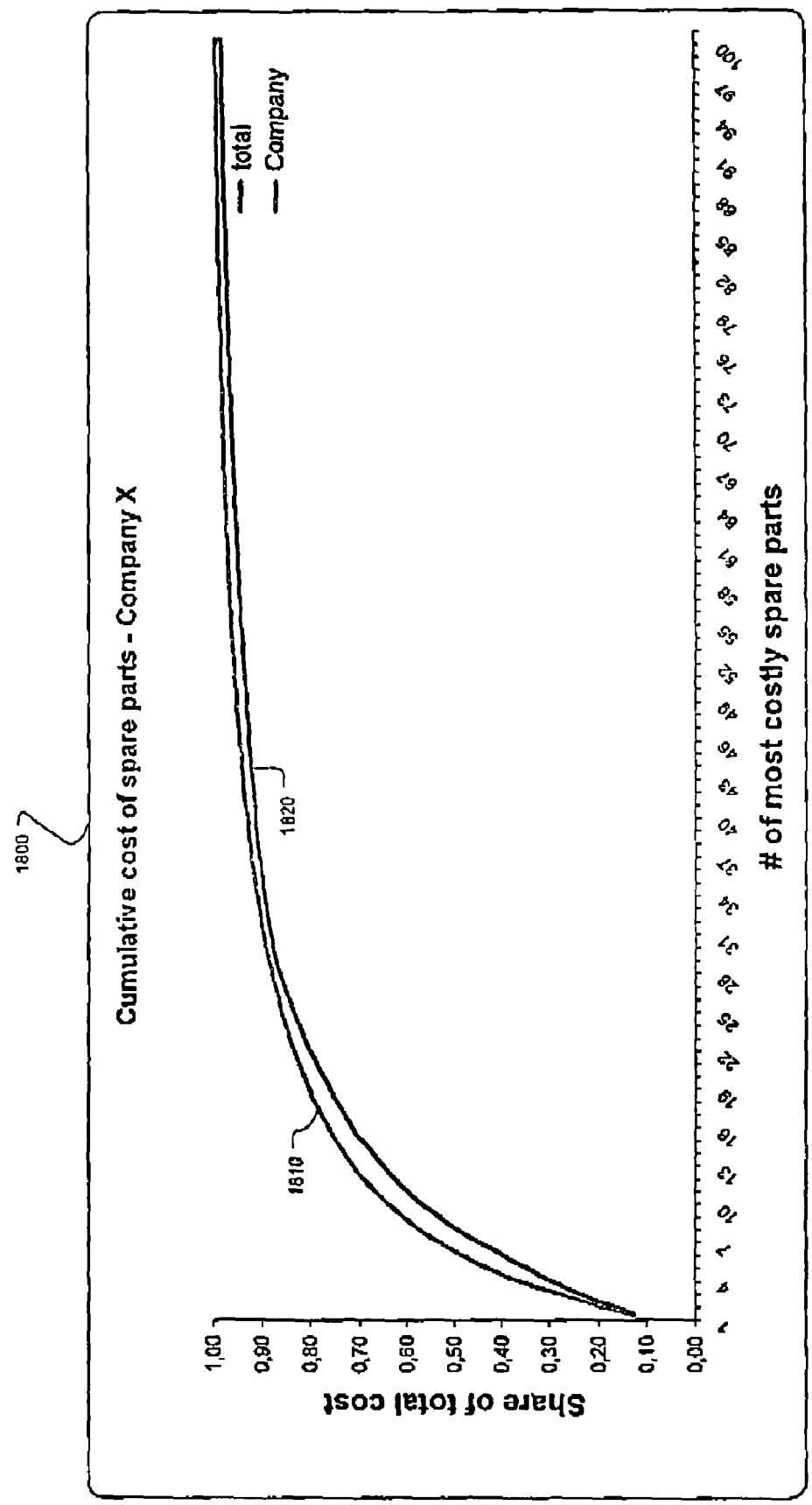
FIG. 18 is an exemplary graph generated by the warranty management system presenting the distribution of spare parts as a share of cumulative spare part value for an ASC.

Additionally, the warranty management system may perform a report and analysis of the distribution of spare parts as a share of cumulative value. As with the distribution of spare parts as a share of cumulative volume, the report of cumulative value analyzes the value or cost of the most common spare parts. Referring now to FIG. 18, spare parts as s share of cumulative spare part value for a service provider, line 1810, is shown as compared against the total number of the spare parts for all service providers, line 1820, in a selected group. Specifically, service provider curve 1810 deviates upward from benchmark curve 1820, which reveals that the service provider company in question is excessively using expensive spare parts in its warranty claims, thereby indicating that its spare part usage is not normal and may be fraudulently inflated to increase warranty compensations. These abnormalities may alternatively indicate product quality or reporting issues.

In each of the foregoing spare parts reports, price distribution, cumulative volume and value in a suspect company are compared against a benchmark or average distribution. Other suitable comparisons may be used, such as known valid spare part data or theoretical expected values. From the graphs generated by the warranty management system, a user may observe peaks for certain spare parts values that are clearly higher than in average companies or other comparison data. This process can identify or confirm fraud by reporting excessive amounts of expensive spare parts. Where a suspect company's distribution curve is above an average curve in a distribution of spare parts price as a share of total cost, FIG. 16, the likelihood of fraud increases. Alternatively, where a smaller number of spare parts in as a share of total volume, FIG. 17, or expensive spare parts are used as s share of total cost, FIG. 18, the likelihood of fraud also increases. Such finding may trigger within the warranty management system a requirement for the service provider to return spare parts for control purposes.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A computer-implemented warranty management data processing method for determining relationships of data associated with warranty claims, the computer including a processor and memory, and the method comprising steps performed by the computer of:
   receiving, by the processor, warranty data for a plurality of products, wherein each of the plurality of products is associated with a serial number;
   storing, by the processor, warranty data for a plurality of products;
   processing, by the processor, warranty claims filed against warranties for the plurality of products by a plurality of warranty service providers;
   generating, by the processor, claims data based on the warranty claims;
   analyzing, by the processor, the stored warranty data and the claims data; and
   generating, by the processor, a first graphical representation of a distribution of the claims data for one of the plurality of the warranty service providers, wherein the distribution of the claims data includes a distribution curve of a differential of the serial numbers associated with the respective claims data, the differential based upon the warranty claims filed by the one of the plurality of the warranty service providers; and
   generating, by the processor, a second graphical representation of a distribution of the claims data for the plurality of the warranty service providers, wherein the distribution of the claims data includes a distribution curve of a differential of the serial numbers associated with the respective claims data, the differential calculated based upon the warranty claims filed by the plurality of the warranty service providers.

2. The warranty management data processing method of claim 1, wherein at least one of the differential based upon the warranty claims filed by one of the plurality of warranty service providers and the differential based upon the warranty claims filed by the plurality of warranty service providers is a differential of sequentially ordered serial numbers.

3. The warranty management data processing method of claim 2, wherein at least one of the differential based upon the warranty claims filed by one of the plurality of warranty service providers and the differential based upon the warranty claims filed by the plurality of warranty service providers is a differential of sequentially ordered serial numbers for theoretical warranty claims, and wherein the distribution curves are compared.

4. The warranty management data processing method of claim 1, wherein the distribution of the claims data includes a distribution of product ages for the plurality of products of the warranty claims filed by the one of the plurality of the warranty service providers.

5. The warranty management data processing method of claim 1, wherein the distribution of the claims data includes a distribution of spare parts data for the plurality of products of the warranty claims filed by the one of the plurality of the warranty service providers.

6. A warranty management data processing system for determining relationships of data associated with warranty claims, the data processing system comprising:
- a storage device configured to store warranty data for a plurality of products, wherein each of the plurality of products is associated with a serial number;
- a claims module for processing warranty claims filed against warranties for the plurality of products by a plurality of warranty service providers and generating claims data based on the warranty claims;
- an analysis module for analyzing the stored warranty data and the claims data, and generating a graphical representation of a distribution of the claims data for one of the plurality of the warranty service providers;
- a distribution module for generating:
  - a first distribution curve of a differential of the serial numbers associated with the respective claims data, the differential based upon the warranty claims filed by the one of the plurality of the warranty service providers, and
  - a second distribution curve of a differential of the serial numbers associated with the respective claims data, the differential calculated based upon the warranty claims filed by the plurality of the warranty service providers.

7. The warranty management data processing system of claim 6, wherein at least one of the differential based upon the warranty claims filed by one of the plurality of warranty service providers and the differential based upon the warranty claims filed by the plurality of warranty service providers is a differential of sequentially ordered serial numbers.

8. The warranty management data processing system of claim 7, wherein at least one of the differential based upon the warranty claims filed by one of the plurality of warranty service providers and the differential based upon the warranty claims filed by the plurality of warranty service providers is a differential of sequentially ordered serial numbers for theoretical warranty claims, and wherein the distribution curves are compared.

9. The warranty management data processing system of claim 6, wherein the distribution of the claims data includes a distribution of product ages for the plurality of products of the warranty claims filed by the one of the plurality of the warranty service providers.

10. The warranty management data processing system of claim 6, wherein the distribution of the claims data includes a distribution of spare parts data for the plurality of products of the warranty claims filed by the one of the plurality of the warranty service providers.

11. A warranty management computer program product, tangibly embodied in a computer-readable storage medium, for determining relationships of data associated with warranty claims and containing instructions that, when executed on a processor, performs a method comprising:
- receiving warranty data for a plurality of products, wherein each of the plurality of products is associated with a serial number;
- storing warranty data for a plurality of products;
- processing warranty claims filed against warranties for the plurality of products by a plurality of warranty service providers;
- generating claims data based on the warranty claims;
- analyzing the stored warranty data and the claims data; and
- generating a first graphical representation of a distribution of the claims data for one of the plurality of the warranty service providers, wherein the distribution of the claims data includes a distribution curve of a differential of the serial numbers associated with the respective claims data, the differential based upon the warranty claims filed by one of the plurality of warranty service providers; and
- generating a second graphical representation of a distribution of the claims data for the plurality of the warranty service providers, wherein the distribution of the claims data includes a distribution curve of a differential of the serial numbers associated with the respective claims data, the differential calculated based upon the warranty claims filed by the plurality of the warranty service providers.

12. The warranty management computer program of claim 11, wherein at least one of the differential based upon the warranty claims filed by one of the plurality of warranty service providers and the differential based upon the warranty claims filed by the plurality of warranty service providers is a differential of sequentially ordered serial numbers.

13. The warranty management computer program of claim 12, wherein at least one of the differential based upon the warranty claims filed by one of the plurality of warranty service providers and the differential based upon the warranty claims filed by the plurality of warranty service providers is a differential of sequentially ordered serial numbers for theoretical warranty claims, and wherein the distribution curves are compared.

14. The warranty management computer program of claim 11, wherein the distribution of the claims data includes a distribution of product ages for the plurality of products of the warranty claims filed by the one of the plurality of the warranty service providers.

15. The warranty management computer program of claim 11, wherein the distribution of the claims data includes a distribution of spare parts data for the plurality of products of the warranty claims filed by the one of the plurality of the warranty service providers.

* * * * *